(12) United States Patent
Kutty

(10) Patent No.: US 6,956,664 B1
(45) Date of Patent: Oct. 18, 2005

(54) GENERATION OF COVER SHEETS BY NETWORKED PRINTER

(75) Inventor: Nanda Kutty, Lake Forest, CA (US)

(73) Assignees: Toshiba Tec Kabushiki Kaisha, Tokyo (JP); Toshiba Corporation, Tokyo (JP)

(*) Notice: Subject to any disclaimer, the term of this patent is extended or adjusted under 35 U.S.C. 154(b) by 0 days.

(21) Appl. No.: 09/574,553

(22) Filed: May 16, 2000

Related U.S. Application Data

(60) Provisional application No. 60/163,343, filed on Nov. 3, 1999.

(51) Int. Cl.[7] .......................... G06F 13/00; G06F 15/00
(52) U.S. Cl. ................... 358/1.15; 358/1.17; 358/1.18; 347/129; 715/515
(58) Field of Search .............................. 358/1.17, 1.18; 347/129; 715/515

(56) References Cited

U.S. PATENT DOCUMENTS

| | | | | |
|---|---|---|---|---|
| 5,124,731 A | * | 6/1992 | Knodt et al. ................. | 347/129 |
| 5,208,905 A | * | 5/1993 | Takakura et al. ............ | 715/515 |
| 5,559,595 A | * | 9/1996 | Farrell ......................... | 399/382 |
| 5,596,389 A | * | 1/1997 | Dumas et al. ................ | 399/16 |
| 5,991,516 A | * | 11/1999 | Desmond et al. ........... | 358/1.17 |
| 6,134,568 A | * | 10/2000 | Tonkin ......................... | 715/526 |
| 6,185,588 B1 | * | 2/2001 | Olson-Williams et al. .. | 715/515 |
| 6,311,029 B1 | * | 10/2001 | Sumio et al. ................. | 399/82 |
| 6,573,974 B1 | * | 6/2003 | Ikeda et al. .................. | 355/25 |
| 2004/0059435 A1 | * | 3/2004 | Goldberg et al. ............ | 700/1 |

* cited by examiner

*Primary Examiner*—Edward Coles
*Assistant Examiner*—Alan Rahimi
(74) *Attorney, Agent, or Firm*—Tucker Ellis & West LLP

(57) ABSTRACT

The disclosure relates to an apparatus and method of generating documents having one or more cover pages. A document may be printed with one or more covers. A user may format the covers as being printed on a front page, printed on a back page, printed on both the front page and the back page, or printed on neither the front page nor the back page. The cover can be printed as two-side even if the remainder of the document is printed as one-sided. The disclosed method and apparatus also allow the user to print a document with a top cover, a back cover, both a top cover and a back cover, or neither.

14 Claims, 6 Drawing Sheets

US 6,956,664 B1

GENERATION OF COVER SHEETS BY NETWORKED PRINTER

RELATED APPLICATION INFORMATION

This application claims priority to U.S. Provisional Patent Application Ser. No. 60/163,343, entitled "Generation of Cover Sheets by Networked Printer," filed Nov. 3, 1999, which is incorporated herein by reference.

This application is related to the following U.S. provisional patent applications, each of which was filed on Nov. 3, 1999 and each of which is incorporated herein by reference: (1) U.S. Provisional Patent Application Ser. No. 60/163,272, entitled "Error Management for a Tandem Printing System"; (2) U.S. Provisional Patent Application Ser. No. 60/163,344, entitled "Dynamic Load Balancing for a Tandem Printing System" and (3) U.S. Provisional Patent Application Ser. No. 60/163,360 entitled "Synchronous Printing."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses and, more particularly, to methods and apparatuses for providing enhanced cover sheet options for computer-generated printed documents.

2. Description of Related Art

Most contemporary operating systems, such as Microsoft Windows, permit a user to print a document on a printer from a networked computer workstation. The printing process typically comprises the user generating a printable document using an application program on a host computer. The host computer is often a computer workstation on a network. The host computer utilizes a printer driver, which, in conjunction with the operating system, converts the document into a language readable by the printer. The printer often comprises the combination of a printer controller coupled to a print engine. The document is then formatted by the printer controller and sent to the print engine for printing.

A printer driver is a software program or file that resides on the host computer, typically on the host computer's hard drive and run from memory (e.g., RAM), rather than the printer itself. The driver takes into account the individual characteristics of a printer and converts graphics and text into device-specific data at the time of printing. A printer driver also gives the host computer and its user an understanding of the capabilities of the printer, so that all the printer features can be used.

The printer driver normally tells the host computer what printer language the printer uses, how many paper feeders it has, and what sizes of paper it can support. The language used by a printer is the set of commands it obeys to format data sent from a computer. The printer driver also allows the user to access many features and options of the printer, such as the generation of cover pages for a document. The printer driver also allows the user to designate a document as duplex, wherein the printer prints the pages of document on both faces of sheets of paper. A document can also be designated as simplex, wherein the printer prints out a document on only the front faces of sheets of paper.

In certain circumstances, a user may desire to provide the document cover with a different format with respect to the remainder of a document. For example, the user may desire to use one type or size of paper for the document cover and another type or size of paper for the remainder of a document. A user may also desire to designate a document cover as duplex and the remainder of the document as simplex, or vice-versa. While some printers allow the user to use different paper types for document covers, there is no simple way for a user to print the cover page of a document in duplex and print the remainder of the document in simplex, or vice-versa.

SUMMARY OF THE INVENTION

The present invention relates to a method of generating documents having one or more cover pages. According to the method, a document may be printed with one or more covers. A user may format the covers as being printed on a front page, printed on a back page, printed on both the front page and the back page, or printed on neither the front page nor the back page. The cover can be printed in duplex even if the remainder of the document is printed in simplex. The process also allows the user to print a document with a top cover, a back cover, both a top cover and a back cover, or neither. Advantageously, the duplex/simplex format of the top cover and back cover may be different.

In one aspect of the invention, there is disclosed a control unit for instructing a printer to print a document. The document comprises a first page 1 through a last page n, the control unit includes computer readable software for instructing a printer to: obtain a sheet of paper from a first paper source, the first sheet comprising a top cover; determine whether the top cover is one-sided, two-sided, or blank and; if the top cover is one-sided, print a first page of the document on one face of the first sheet of paper; if the cover is two-sided, print a first page of the document on a front face of the first sheet of paper and printing a second page of the document on a back face of the first sheet of paper; if the cover is blank, output the first sheet of paper with a blank front face and a blank back face. The software is further for instructing a printer to obtain one or more subsequent sheets of paper from a second paper source; and print one or more pages from a remainder of the document using the one or more subsequent sheets of paper, wherein each page of the remainder of the document is printed on only one face of each of the one or more subsequent sheets of paper.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
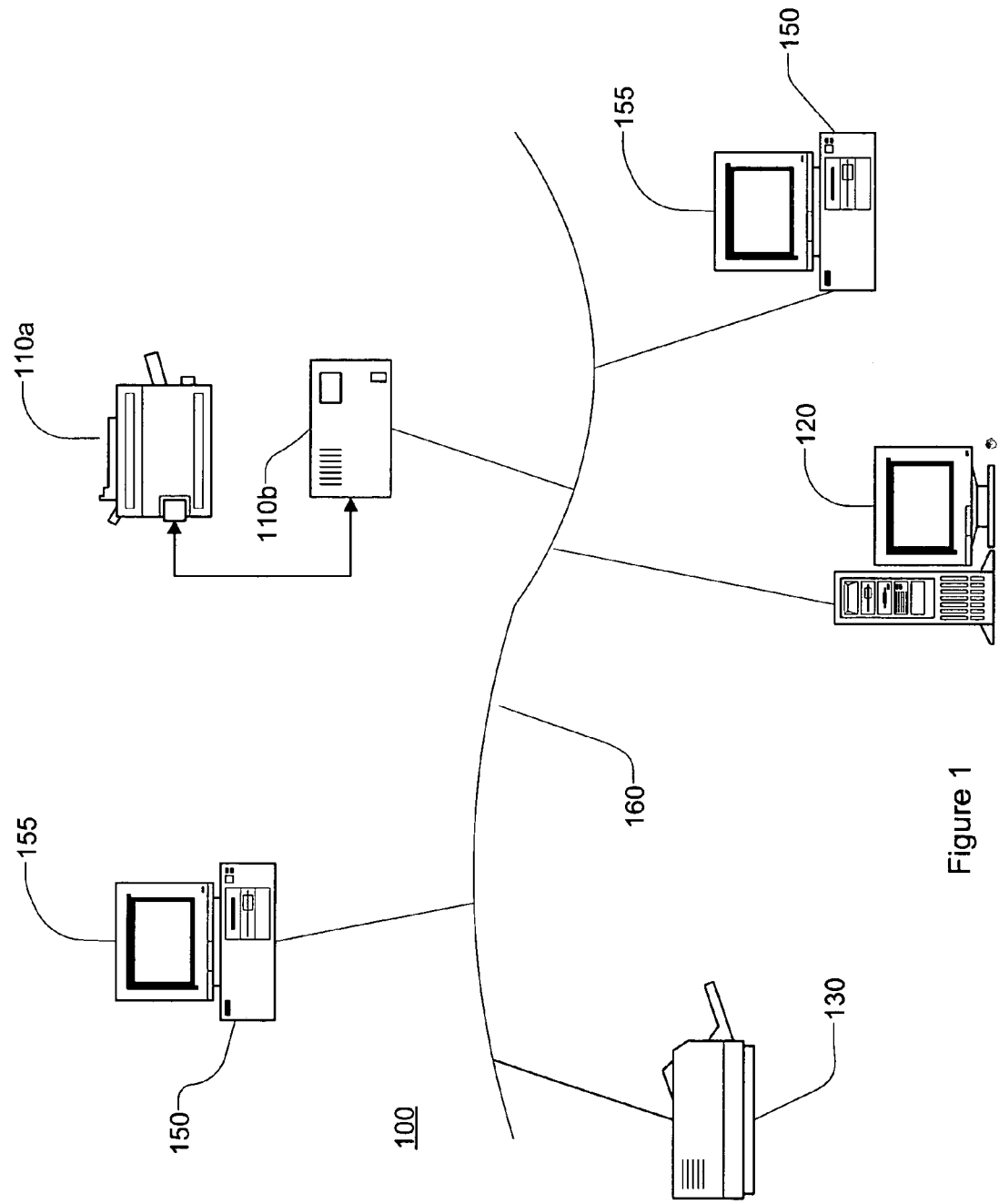
FIG. 1 is a block diagram of a LAN including a plurality of multifunction peripherals.

Referring now to FIG. 1 there is shown a block diagram of a local area network (LAN) 100 in accordance with the present invention. The LAN 100 includes a file server 120, printer 130, workstations 150, and a Host 110b coupled to one another via network communications lines 160. The Host 110b is also referred to as a controller or as a control unit. The file server 120 and workstations 150 are preferably those well known in the art, such as computers having Intel Corporation (Santa Clara, Calif.) microprocessors and running Microsoft Corporation (Redmond, Wash.) Windows or Windows NT operating systems. A multifunction peripheral (MFP) 110a is coupled to the Host 110b. The MFP 110a is configured to produce a hard copy record of data, typically on paper. The LAN 100 may also include hubs, routers and other devices (not shown).

On computer workstations such as computer workstations 150 there typically will be a number of application programs with which a user may create, edit and print object instances by use of input output devices such as a display 155, a mouse and a keyboard (not shown). These application programs may be for word processing, graphics, spreadsheets, presentations and many other purposes.

Before proceeding to describe the LAN 100, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, typically providing printing and at least one of: copying, scanning and faxing.

By "printer driver" it is meant (1) a program which takes into account the physical characteristics of a printer and which is used to convert graphics and text into device-specific data at the time of printing, or (2) a file which describes the physical characteristics of a printer and which is used by an operating system or other software to convert text and graphics into device-specific data at the time of printing.

Figure 2:
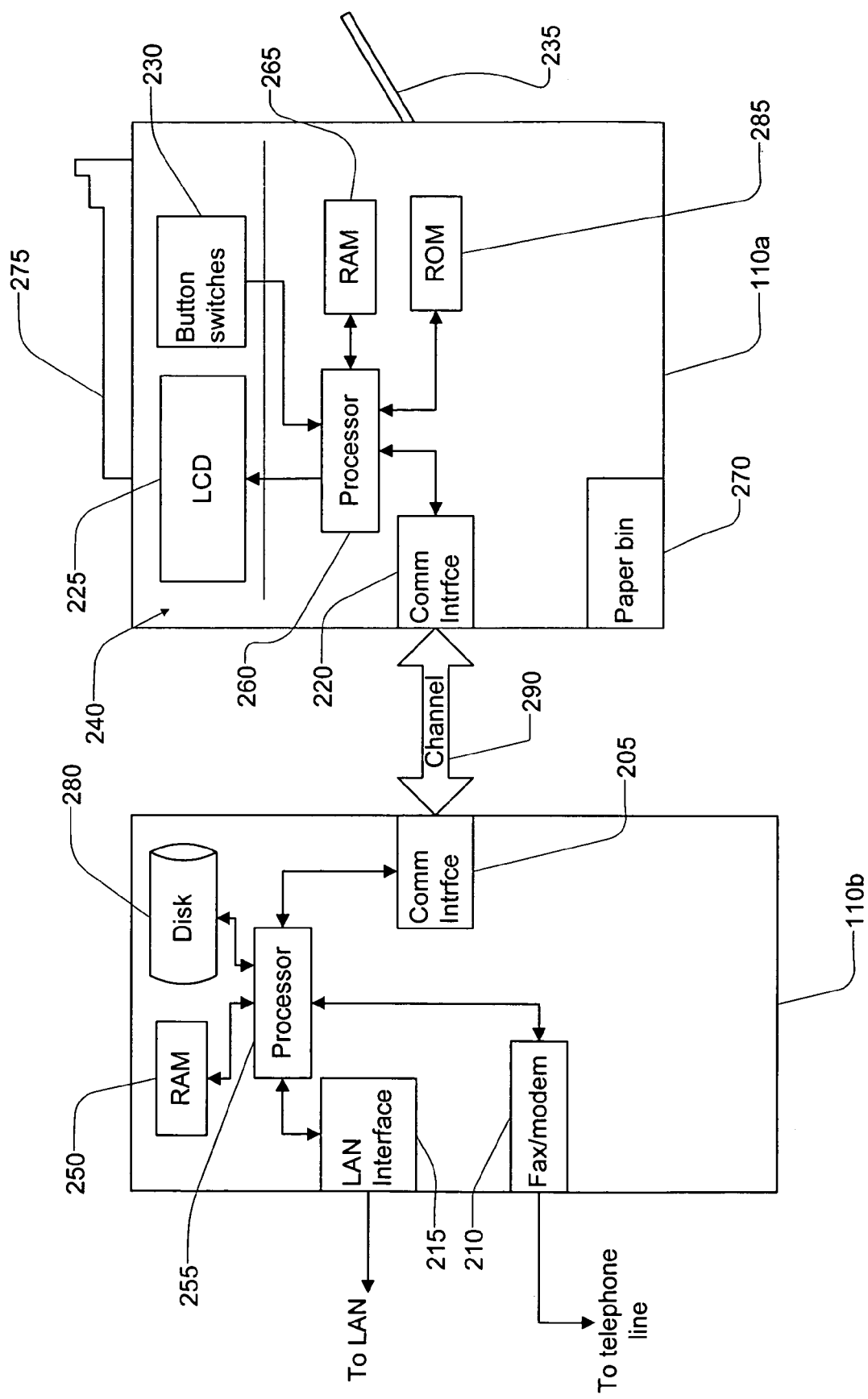
FIG. 2 is a block diagram of a data processing system including a Host and an MFP.

Turning now to FIG. 2, there is shown a block diagram of a data processing system comprising the MFP 110a and the Host 110b. The MFP 110a preferably comprises a high output digital copier having a communications interface 220, which as presently embodied comprises a small computer systems interface (SCSI). The MFP 110a further preferably comprises a hardware and software interface which allows the MFP 110a to receive rasterized print jobs from the Host 110b, manage the print jobs as well as its own copy jobs, and print the print jobs. The hardware and software interface of the MFP 110a further allows the MFP 110a to forward facsimile send jobs from the MFP 110a to a fax/modem 210 in the Host 110b. The MFP 110a includes a short-term memory 265, which preferably comprises random access memory (RAM) and a processor 260 in which programs are stored and run, respectively, for controlling the functions of the MFP 110a. The MFP 110a preferably also includes a long-term memory 285 such as a read only memory (ROM) or electronically programmable read only memory (EPROM). The MFP 110a may also include a disk drive (not shown) for both long term and short-term storage. The MFP 110a includes standard components including an automatic document feeder 275, paper bin 270 and paper output tray 235.

The MFP 110a includes a non-fixed display 225, preferably a liquid crystal display (LCD), and a user input device 230, such as button switches. The MFP 110a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

The Host 110b preferably comprises a server, and is a computer having an Intel processor 255 and running Microsoft Windows NT. In conjunction with the processor 255, the Host 110b has a short term memory 250 (preferably RAM) and a long term memory 280 (preferably a hard disk) as known in the art. A fax/modem 210 is for sending and receiving facsimiles via telephone lines. The Host 110b preferably provides storage, for example in long term memory 250, for holding incoming facsimile transmissions for extended periods and in substantial amounts when a hold is placed on printing facsimile jobs. The Host 110b includes a communications interface 205 through which the Host 110b communicates with the MFP 110a via a channel 290. Preferably, the communications interface 205 is configured as a SCSI Host.

The Host 110b further preferably comprises a hardware 215 and software interface which allows the Host 110b to receive print jobs and facsimile send jobs from the LAN 100, receive facsimile jobs from the MFP 110a and transmit rasterized print jobs to the MFP 110b. The Host 110b includes management software stored in the long term memory 280 for managing print jobs, facsimile jobs and scan jobs. The Host 110b rasterizes print jobs received from the LAN 100 into print data (in a form native to the MFP 110a) and transmits the print data to the MFP 110a via the communications interface 205. The Host 110b executes facsimile send jobs, received from either the LAN 100 or the MFP 110a, on the fax/modem 210.

Figure 3:
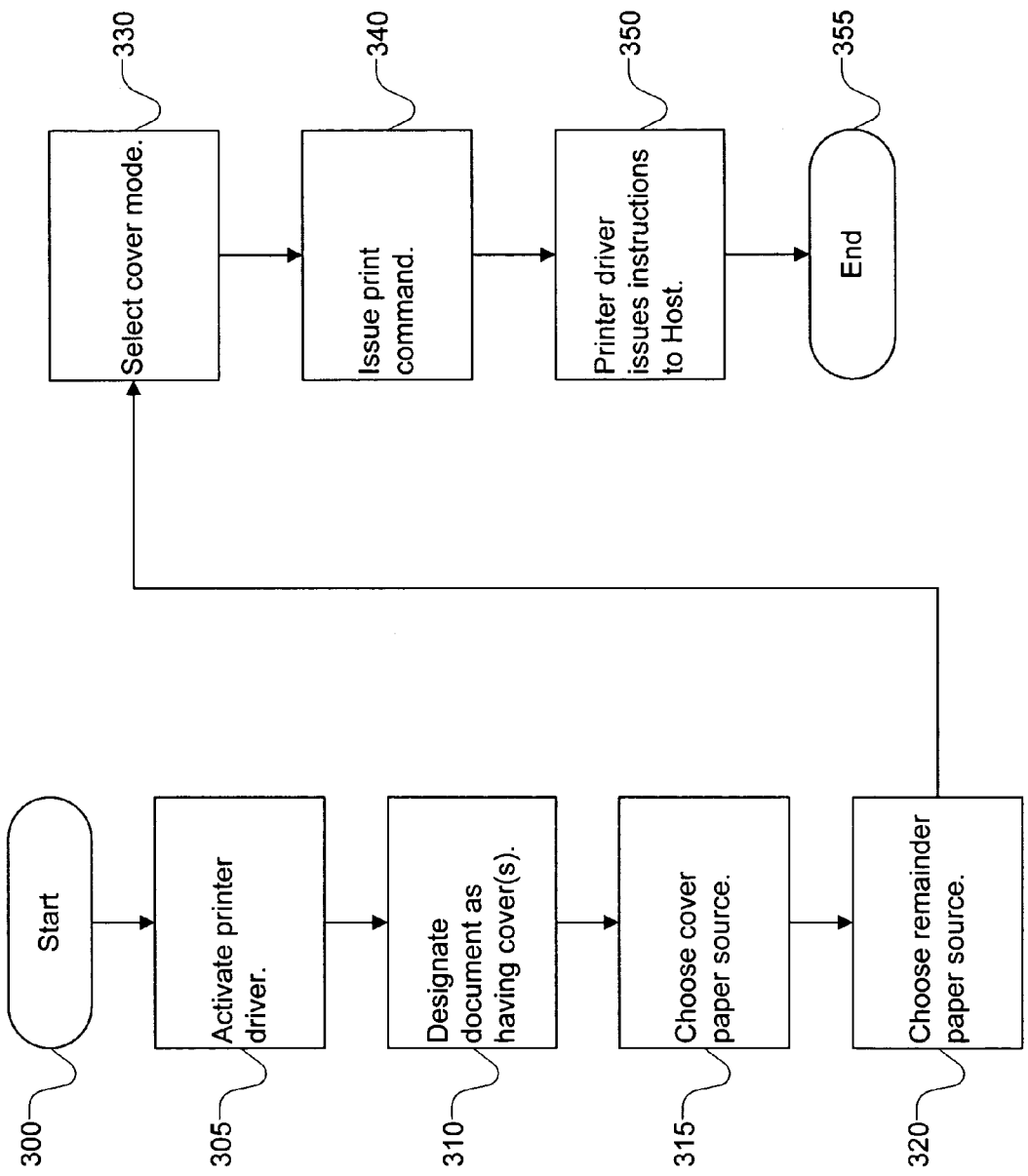
FIG. 3 is a flow chart of a method of printing a document having one or more cover pages.

FIG. 3 shows a flow chart describing a method of printing an object instance that includes one or more cover sheets. In the first step, a user indicates an object instance for printing and activates a printer driver at one of the computer workstations 150 (step 305). In MS Windows, object instances may be selected for printing from within a particular application while editing the object instance, such as a word processor, or from views of lists of files, such as the Windows Explorer. The object instance may be, for example, a document, or one or more selected pages of a document.

The method is described with respect to a document being printed from a word processing program. The document has 1 through n pages, with page 1 being a first page and page n being the last page of the document. The MFP 110b prints each page of the document on a sheet of paper. Each sheet of paper has two faces, a front face and a back face, with each face having the capacity to contain at least one page of a document. Thus, one sheet of a paper can include two pages of a document if both the front face and back face of the sheet of paper are used for printing. The MFP 110b is configured to output a sheet of paper with printing on the front face, on the back face, or on both the front face and the back face. Printing of a document on both the front face and the back face of a paper sheet is referred to as duplex printing. Printing of a document on only the front face or only the back face of a paper sheet is referred to as simplex printing.

Figure 4:
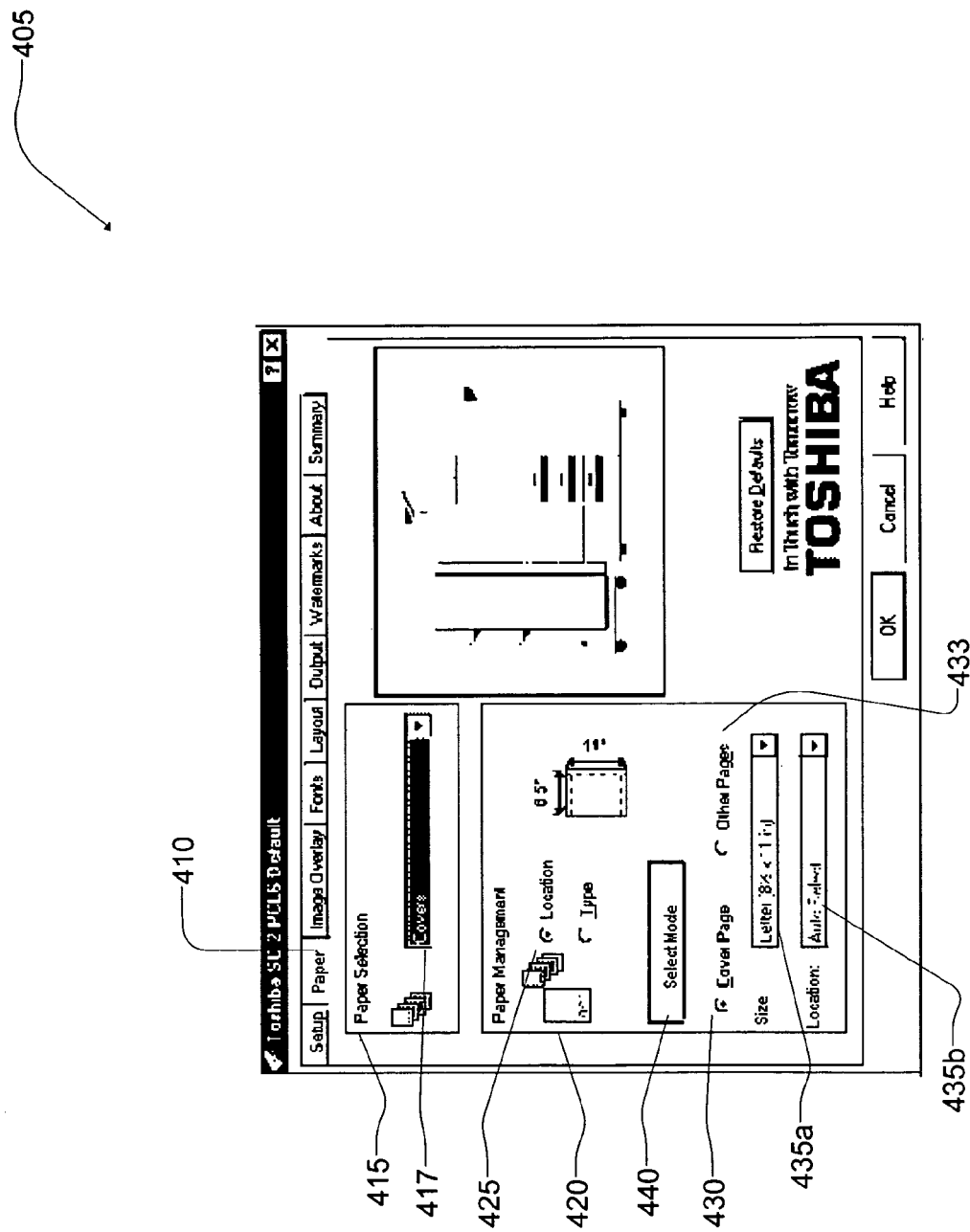
FIG. 4 is a representative screen shot showing a step in formatting a cover page for a document.

Typically, when a user invokes a print command, the application program generates a user interface in the form of a dialog window that provides the user with various options with respect to printing. The dialog window typically allows the user to activate the printer driver of the selected MFP (or printer) to take advantage of certain capabilities of the MFP, such as the generation of covers. This is typically achieved by pressing a "Properties" button with the mouse. When such a button is selected, the printer driver causes a user interface in the form of a properties window 405 to be displayed on the computer workstation's display 155, as shown in FIG. 4. In a preferred embodiment, the properties window 405 includes a "Paper" tab 410 that provides the user with various options relating to paper properties for the document, including with respect to the format of one or more covers for the document.

A "cover" is defined as a blank or printed sheet of paper that is located at the beginning or the end of the document. A "top" cover is defined as a cover that is located at the beginning of a printed document. A "bottom" cover is defined as a cover that is located at the end of a printed document. A cover that is "printed on front" is printed on the front face of a sheet of paper. A cover that is "printed on back" is printed on the back face of a sheet of paper. A cover may be either printed only on the front (one-sided), printed only on the back (one-sided), or printed on both the front and the back (two-sided). A cover may also be printed on neither the front nor the back. Such a cover comprises a cover that is blank on both the front and back face of a sheet of paper.

A "booklet cover" is a magazine sorted document wherein the document may be folded in half to represent a book in left-to-right or right-to-left reading order. The "remainder" of the document is defined as the pages of a document that are not printed on the front face or the back face of the cover(s).

In step 310, the user designates the document as a document that includes one or more cover pages. Toward this end, the properties window 405 includes a user-selectable option for designating the document as including a cover page. In one embodiment, the properties window 405 includes a "paper selection" box 415 having a pull down selection menu 417 (FIG. 4). The user preferably clicks on the pull-down selection menu 417 and select a "Covers" option to thereby designate the document as having a cover (front, back or both).

The user also preferably specifies the location of the paper source from which the MFP 110a obtains paper for printing of covers (step 315). The properties window 405 includes a "paper management" box 420 that includes a user-selectable "location" checkbox 425 and a "cover" checkbox 430. Using an input device such as a mouse, the user clicks on the checkboxes 425, 430 and then designates a paper size and a paper source using pull-down menus 435a and 435b, respectively, that display one or more paper sources. The paper source preferably comprises the paper cassette from which the MFP 110a obtains sheets of paper for printing of the document. Thus, when printing the covers, if any, the MFP 110a uses sheets of paper from the paper source specified by the user. The user can also designate a paper source for the remainder of the document (step 320) by selecting an "other page" checkbox 433 and then specifying the paper size and cassette location using pull-down menus 435a and 435b. The paper source for the remainder may be the same or different than the paper source for the cover.

After specifying the paper sources for the cover and remainder, the user preferably designates the cover mode for the document (step 330). The cover mode relates to the formatting features of each cover page, including whether the document includes a top cover, a bottom cover, or both, and whether the cover(s) are printed on front and/or printed on back. The properties window 405 preferably provides the user with a way of designating the format of the cover page(s) of the document. In one embodiment, the properties window 405 includes a user-selectable item, such as a button 440. When the user selects the button 440 using a computer input device, the printer driver causes a cover mode dialog 510 (FIG. 5) to appear on the computer display 155.

Figure 5:
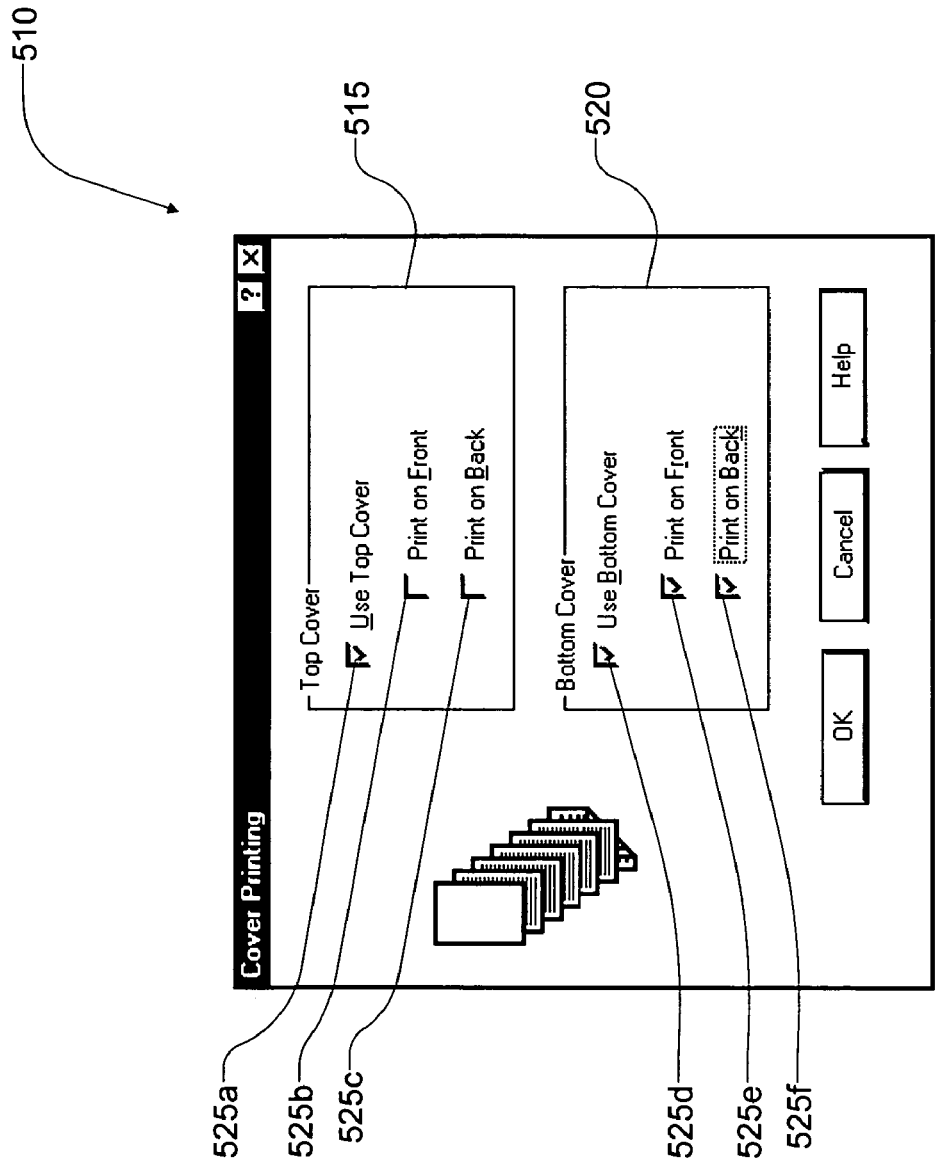
FIG. 5 is a representative screen shot showing another step in formatting a cover page for a document.

With reference to FIG. 5, the cover mode dialog 510 provides the user with various options regarding the formatting of a top cover and a bottom cover. The cover mode dialog 510 includes a top cover box 515 and a bottom cover box 520 that provide formatting options with respect to the top cover and bottom cover of the document, respectively. The top and bottom cover boxes 515, 520 preferably each include one or more checkboxes 525 that allow the user to activate or deactivate formatting options for the top and bottom covers. Each checkbox 525 includes a label that describes a feature associated with the checkbox. Preferably, the user activates or deactivates the feature by clicking on the corresponding checkbox 525 using a mouse pointer. When a checkbox is activated, an indicator such as a checkmark is preferably superimposed over the checkbox.

The top cover box 515 includes top cover checkboxes 525a, 525b, and 525c. The checkbox 525a preferably allows the user to enable a top cover for the document. That is, when the user activates the checkbox 525a, the document includes a top cover that is formatted as specified by the user via checkboxes 525b and 525c. If the user does not activate checkbox 525a, then the document does not include a top cover. That is, the first page of the document is printed in the same format and from the same paper source as the remainder of the document.

When checkbox 525a is activated, the user can activate the checkboxes 525b and 525c to specify whether the top cover is printed on front or printed on back, respectively, or both printed on front and printed on back. Advantageously, the user can activate various combinations of buttons 525b and 525c to vary the format of the top cover, as follows:

(1) When the user activates checkbox 525b and does not activate checkbox 525c, the top cover is printed only on front. In such a case, the MFP 110a prints the first page of the document on the front face of the top cover.

(2) When the user activates checkbox 525c and does not activate checkbox 525b, the top cover is printed only on back. In such a case, the MFP 110a prints the first page of the document on the back face of the top cover.

(3). When the user activates both checkboxes 525b and 525c, then the top cover is printed on front and printed on back. Here, the MFP 110a prints the first page of the document on the front face of the top cover and the second page of the document on the back face of the top cover.

(4) When the user activates neither 525b nor 525c, then the front face and the back face of the top cover are both blank. In such a case, the MFP 110a prints a blank sheet of paper prior to printing the remainder of the document. The MFP 110a then prints the remainder of the document, with the first page of the document being the first page of the remainder.

The bottom cover box 520 includes bottom cover checkboxes 525d, 525e, and 525f, which relate to the bottom cover in the same manner that checkboxes 525a, 525b, and 525c, respectively, relate to the top cover. The user activates checkbox 525d to enable a bottom cover for the document. When checkbox 525d is activated, the user can also activate the checkboxes 525e and 525f to specify whether the bottom cover is printed on front or printed on back, respectively. If checkbox 525d is activated, the user can activate combinations of checkboxes 525e and 525f, as follows:

(1) When the user activates checkbox 525e and does not activate checkbox 525f, the bottom cover is printed only on front. In such a case, the MFP 110a prints the last page of the document on the front face of the bottom cover.

(2) When the user activates checkbox 525f and does not activate checkbox 525e, the bottom cover is printed only on back. In such a case, the MFP 110a prints the last page of the document on the back face of the bottom cover.

(3) When the user activates both checkboxes 525e and 525f, then the bottom cover is printed on front and printed on back. In this case, the MFP 110a prints the second-to-last page of the document on the front face of the bottom cover and the last page of the document on the back face of the bottom cover.

(4) When the user activates neither 525e nor 525f, then the front face and the back face of the bottom cover are both blank. In such a case, the MFP 110a outputs a blank sheet of paper after the last page of the document. The MFP 110a obtains the blank sheet from the location that the user specified for cover sheets.

With reference again to FIG. 3, the method continues when the user accepts the previously defined cover sheet instructions, such as by clicking on "OK" buttons on the appropriate pages, as will be known to those skilled in the art. The user then issues a command for the application to print the document (step 340).

The printer driver ("driver") then, in step 350, issues instructions to the Host 110b to instruct the MFP 110a to print the document in the form of a print file. The instructions preferably include commands specifying whether the cover(s) are printed in simplex or duplex and also specifying the paper source location for the covers. The instructions also include commands specifying whether the remainder is simplex or duplex and specifying the paper source location for the remainder. Once it receives the print file, the Host 110b utilizes software to processes the contents of the print file, including invoking interpretation, formatting, and rasterizing tasks for the print file. The Host 110b then instructs the MFP 110a to output the document.

Figure 6:
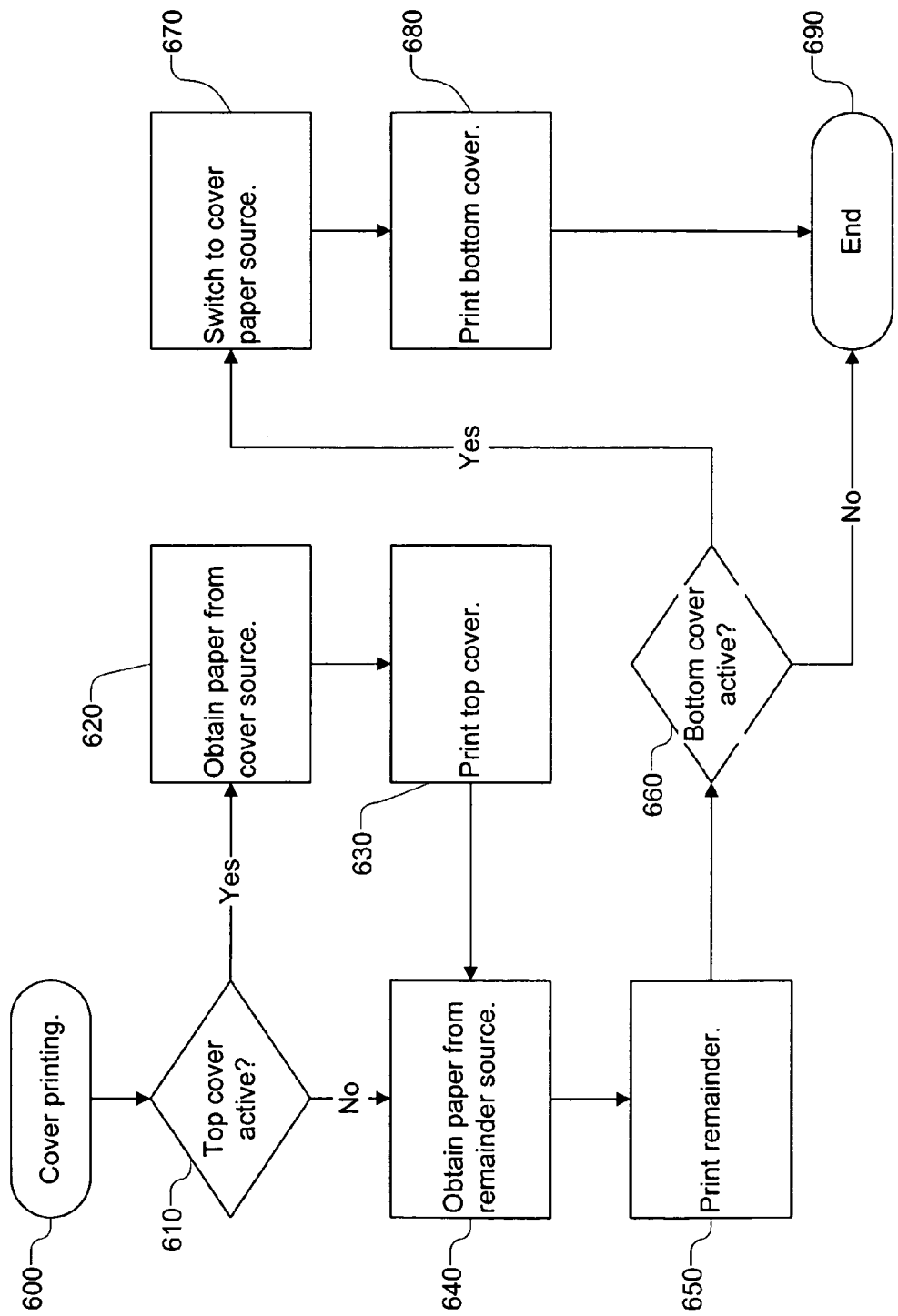
FIG. 6 is a flow chart that further described the method of printing a document having one or more cover pages.

The print instructions issued by the driver and/or the Host 110b are dependent on whether the document includes a top cover and/or a bottom cover. The instructions vary depending on whether the cover(s) are printed on front, printed on back, or both, and also on whether the MFP 110a is in simplex mode or duplex mode. FIG. 6 is a flow chart that further describes the method of printing a document with cover pages. The method is described in terms of instructions that the Host 110b submits to the MFP 110a.

The Host 110b first determines whether the user activated a top cover for the document. If so, the Host 110b instructs the MFP 110a to obtain paper from the cover paper source, as specified by the user (step 620). The cover paper source preferably comprises a paper cassette coupled to the MFP 110a. The Host 110b then instructs the MFP 110a to print the top cover. The top cover is either printed on back, printed on front, printed on both front or back, or neither, as specified by the user. After the top cover has been printed, the Host 110b instructs the Host 110a to start obtaining paper from the paper source for the remainder, which preferably comprises a paper cassette specified by the user (step 630).

If the user did not activate a top cover for the document, then the Host 110b instructs the MFP 110a to obtain paper from the remainder paper source (step 630). The Host 110b then instructs the MFP 110a to start printing the remainder of the document (step 650). The simplex/duplex mode for the remainder of the document can be different than the simplex/duplex mode of the cover. For example, the MFP 110a may print the remainder of the document in simplex even if the cover is printed in duplex.

The Host 110b determines whether the user activated a bottom cover for the document (step 660). If the user did not activate a bottom cover for the document, the MFP 110a prints the entire document using paper from the remainder paper source. The method then ends. However, if the user did activate a bottom cover, the Host 110b instructs the MFP 110a to switch paper the paper source to the cover paper source, starting at the appropriate page in the document (step 670). The page at which the MFP 110a switches paper sources is dependent on whether the bottom cover is printed on front, printed on back, both, or neither, as described below. The Host 110b then issues instructions for the MFP 110a to print the bottom cover (step 680). The process is then complete.

As mentioned, the specific print instructions for the covers may vary depending on the format that the user selected for the covers. The print instructions for the various embodiments of a top cover are summarized below:

(1) Top cover active, top cover printed on neither front nor back: At the beginning of the first page of the document, the printer driver emits instructions for the MFP 110a to obtain paper from the cover paper source (i.e., paper cassette location for the cover). The printer driver then emits a line feed. This causes the MFP 110a to obtain paper from the appropriate paper source prior to outputting the cover, which is output with a blank front face.

At the end of the first page of the document, the driver determines whether the MFP 110a is in duplex mode or simplex mode. If the MFP 110a is in duplex, the driver emits instructions for another line feed, thereby causing the MFP 110a to output the back face of the top cover as a blank face. If the MFP 110a is in simplex mode, then no line feed is emitted, as the MFP 110a does not print on the back face for simplex. At the beginning of the second page of the document, the driver emits instructions for the MFP 110a to start obtaining paper from the paper source for the remainder of the document (as specified by the user in step 320). The MFP 110a then uses the appropriate paper source for printing the remainder of the document.

(2) Top cover active, top cover printed only on front: At the beginning of the first page of the document, the driver emits instructions for the MFP 110a to obtain paper from the cover paper source. The MFP 110a thus uses the specified paper source when printing the top cover. At the end of the first page of the document, if the MFP 110a is in duplex mode, then the driver emits instructions for a line feed, which causes the MFP 110a to output the back face of the top cover as a blank face. If the MFP 110a is in simplex mode, no line feed is emitted at the end of the first page, as the MFP 110a does not print on the back face for simplex documents.

At the beginning of the second page, the driver emits instructions for the MFP 110a to start accessing paper from the paper source for the remainder of the document. The MFP 110a then access sheets of paper from the appropriate paper source for printing the remainder of the document.

(3) Top cover active, top cover printed only on back: At the beginning of the first page of the document, the driver ascertains whether the MFP 110a is in duplex mode or simplex mode. This is referred to as the original mode of the MFP 110a. The driver then emits instructions to enable duplex mode for the MFP 110a. The driver next emits instructions for the MFP 110a to obtain paper from the cover paper source. The driver thereafter emits a line feed. This causes the MFP 110a to access a sheet of paper from the cover paper source and output the front face of the top cover as a blank face. Because the MFP 110a is in duplex mode, the MFP 110a prints the first page of the document on the back face of the top cover.

At the beginning of the second page of the document, the driver emits instructions for the MFP 110a to start obtaining paper from the paper source for the remainder. The driver also emits instructions for the MFP 110a to return to the original mode. Alternatively, if the original mode was simplex, the printer driver emits a line feed at the end of each page after the first page of the document. This causes the MFP 110a to simulate simplex. If the original mode was duplex, then no line feed is emitted at the end of each page after the first page of the document. The MFP 110a then prints the remainder as duplex.

(4) Top cover active, top cover printed on front and printed on back: At the beginning of the first page of the document, the driver ascertains whether the MFP 110a is in duplex mode or simplex mode. This is referred to as the original mode of the MFP 110a. The driver then emits instructions to enable duplex printing for the MFP 110a. The driver then emits instructions for the MFP 110a to access paper source from the cover paper source. The MFP 110a thus begins printing the pages of the document using paper from the cover paper source. Because duplex was enabled, the MFP 110a prints the first page of the document on the front face of the top cover and the second page on the back face of the top cover.

At the beginning of the third page of the document, the driver emits instructions for the MFP 110a to start obtaining paper from the paper source for the remainder of the document. The driver then emits instructions for the MFP 110a to return to the original mode. Alternatively, if the original mode was simplex, the printer driver emits a line feed at the end of each page after the second page of the document. This causes the MFP 110a to simulate simplex. If the original mode was duplex, then no line feed is emitted at the end of each page after the second page of the document. The MFP 110a then prints the remainder as duplex.

If the user enabled a bottom cover for the document, the driver also issues instructions describing the selected format of the bottom cover, as described below. The instructions are issued in combination with the previously described instructions for the top cover, if enabled.

(1) Bottom cover active, bottom cover printed on neither back nor front: At the end of the last page of the document, the driver emits instructions for the MFP 110a to obtain paper from the cover paper source. This causes the MFP 110a to use the specified paper source when printing the back cover. The printer driver thereafter emits a line feed, which causes the MFP 110a to output a single sheet having a blank front face and a blank back face at the end of the document.

(2) Bottom cover active, bottom cover printed only on front face: At the beginning of the last page of the document, the driver emits instructions for the MFP 110a to obtain paper from the cover paper source. The MFP 110a then prints the last page of the document on the front face of the bottom cover using the cover paper source.

(3) Bottom cover active, bottom cover printed only on back face: At the beginning of the first page of the document, the driver determines an original mode of the MFP 110a, which is either simplex or duplex. The driver then emits instructions to enable duplex printing for the MFP 110a. At the end of each page of the document except the last page, the driver emits a line feed if the original mode was simplex. This causes the MFP 110a to simulate simplex although the MFP 110a is actually in duplex. If the original mode was duplex, then no line feed is emitted at the end of each page of the document.

At the beginning of the last page of the document, the driver emits instructions for the MFP 110a to access paper sheets from the cover paper source. The driver then emits a line feed, causing the MFP 110a to print the last page of the document on the back face of the cover using paper sheets from the cover paper source.

(4) Bottom cover active, bottom cover printed on front face and printed on back face: At the beginning of the first page of the document, the driver determines an original mode of the MFP 110a, which is either simplex or duplex. At the beginning of the first page, the driver also emits instructions to enable duplex printing for the MFP 110a. If the original mode was simplex, the driver emits a line feed at the end of each page before the second to last page. No line feed is emitted at the end of each page before the second to last page if the original mode was duplex. At the beginning of the second to last page, the driver emits instructions for the MFP 110a to use sheets of paper from the cover paper source. The MFP 110a then prints the bottom cover in duplex using paper from the cover paper source.

According to the aforementioned process, the document may be printed with cover(s) in duplex or simplex even if the remainder of the document is printed in a different duplex/simplex format than the cover. The process also allows the user to print a document with a top cover, a back cover, both a top cover and a back cover, or neither. Advantageously, the duplex/simplex format of the top cover and back cover may be different.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of processing network-based print jobs, each job being comprised of at least one document including a first page 1 through a last page n, wherein a control unit receives each print job from one of a plurality of computer workstations in a computer network and wherein each document was created at an associated computer workstation using an application program, the method comprising:
    selectively calling, via a document processing application, a printer driver disposed on each of a plurality of computer workstations;
    receiving into the control unit from each of the plurality of workstations, via a data network, data instructing the control unit to initiate print of a selected cover sheet with an associated print job;
    communicating with each of the plurality of workstations, from the control unit, cover sheet option data representative of print options available for the print job, which print options include paper stock and print format associated with the selected cover sheet;
    generating, via each called printer driver at an associated one of the plurality of workstations, a user interface adapted to prompt an associated user with cover sheet options set by the cover sheet option data;
    receiving, via each called printer driver, input from each associated user, cover specification data representative of user-selected cover sheet properties selected from the cover sheet options;
    receiving, from the printer driver of each of the plurality of workstations, the cover specification data representative of a selected set of the print options for each associated print job;
    communicating the cover specification data from each printer driver to the control unit vial the network;
    the control unit, in accordance with received cover specification data, causing a printer to obtain a first sheet of paper from a first paper source specified thereby, the first sheet comprising a top cover;
    the control unit determining whether the top cover is one-sided, two-sided, or blank and;
    (i) if the top cover is one-sided, the control unit causing the printer to print a first page of the document on one face of the first sheet of paper;
    (ii) if the top cover is two-sided, the control unit causing the printer to print a first page of the document on a front face of the first sheet of paper and print a second page of the document on a back face of the first sheet of paper;
    (iii) if the top cover is blank, the control unit causing the printer to output the first sheet of paper with a blank front face and a blank back face;
    the control unit causing the printer to obtain one or more subsequent sheets of paper form a second paper source;
    the control unit causing the printer to print one or more pages from a remainder of the document using the one or more subsequent sheets of paper, wherein each page of the remainder of the document is printed on only one face of each of the one or more subsequent sheets of paper.

2. The method of printing a document of claim 1, wherein if the top cover is two-sided, the control unit causes the printer to print a first page of the document on a front face of the first sheet of paper.

3. The method of printing a document of claim 1, wherein if the top cover is two-sided, the control unit causes the printer to print a first page of the document on a back face of the first sheet of paper.

4. The method of printing a document of claim 1, further comprising:
    (a) the control unit causes the printer to obtain a last sheet of paper from the first paper source, the last sheet of paper comprising a bottom cover;
    (b) the control unit causes the printer to print the last page of the document on a face of the last sheet of paper.

5. The method of printing a document of claim 4, wherein the last page of the document is printed on a front face of the last sheet of paper.

6. The method of printing a document of claim 4, wherein the last page of the document is printed on a front face of the last sheet of paper.

7. The method of printing a document of claim 6, wherein a second to last page of the document is printed on a front face of the last sheet of paper.

8. A system for processing network-based print jobs, each job being comprised of at least one document including a first page 1 through a last page n, wherein a control unit receives each print job from one of a plurality of computer workstations in a computer network and wherein each document was created at an associated computer workstation using an application program, the system comprising:
    means for selectively calling, via a document processing application, a printer driver disposed on each of a plurality of computer workstations;
    means for receiving into the control unit from each of the plurality of workstations, via a data network, data instructing the control unit to initiate print of a selected cover sheet with an associated print job;
    means for communicating with each of the plurality of workstations, from the control unit, cover sheet option data representative of print options available for the print job, which print options include paper stock and print format associated with the selected cover sheet;
    means for generating, via each called printer driver at an associated one of the plurality of workstations, a user interface adapted to prompt an associated user with cover sheet options set by the cover sheet option data;
    means for receiving, via each called printer driver, input from each associated user, cover specification data representative of user-selected cover sheet properties selected from the cover sheet options;
    means for receiving, from the printer driver of each of the plurality of workstations, the cover specification data representative of a selected set of the print options for each associated print job;
    means for communicating the cover specification data from each printer driver to the control unit vial the network;
    the control unitincludingng means for causing a printer to obtain, in accordance with received cover specification data, a first sheet of paper from a first paper source specified thereby, the first sheet comprising a top cover;

the control unit further including meand for determining whether the top cover is one-sided, two-sided, or blank and;

(i) if the top cover is one-sided, the control unit causing the printer to print a first page of the document on one face of the first sheet of paper;

(ii) if the top cover is two-sided, the control unit causing the printer to print a first page of the document on a front face of the first sheet of paper and print a second page of the document on a back face of the first sheet of paper;

(iii) if the top cover is blank, the control unit causing the printer to output the first sheet of paper with a blank front face and a blank back face;

the control unit causing the printer to obtain one or more subsequent sheets of paper form a second paper source;

the control unit further including means for causing the printer to print one or more pages from a remainder of the document using the one or more subsequent sheets of paper, wherein each page of the remainder of the document is printed on only one face of each of the one or more subsequent sheets of paper.

9. The system of claim 8, wherein the control unit causes the printer to print a first page of the document on a front face of the first sheet of paper when the top cover is two-sided.

10. The system of claim 8, wherein the control unit causes the printer to print a first page of the document on a back face of the first sheet of paper when the top cover is two-sided.

11. The system of claim 8, wherein:

(a) the control unit causes the printer to obtain a last sheet of paper from the first paper source, the last sheet of paper comprising a bottom cover;

(b) the control unit causes the printer to print the last page of the document on a face of the last sheet of paper.

12. The system of claim 11, wherein the last page of the document is printed on a front face of the last sheet of paper.

13. The system of claim 11 wherein the last page of the document is printed on a front face of the last sheet of paper.

14. The system of claim 13, wherein a second to last page of the document is printed on a front face of the last sheet of paper.

* * * * *